United States Patent [19]

McCarley

[11] 3,870,831

[45] Mar. 11, 1975

[54] TELEPHONE HOLD CIRCUIT

[76] Inventor: William I. McCarley, 901 24th Ave. S.W., Norman, Okla. 73069

[22] Filed: June 27, 1973

[21] Appl. No.: 375,796

[52] U.S. Cl. .................................. 179/99, 179/81 R

[51] Int. Cl. .............................................. H04n 1/00

[58] Field of Search ........ 179/99, 81 R, 84 L, 81 C, 179/84 R

[56] References Cited

UNITED STATES PATENTS 3,742,151 6/1973 Ruether ................................ 179/99

*Primary Examiner*—Kathleen H. Claffy
*Assistant Examiner*—Joseph Popek
*Attorney, Agent, or Firm*—Laney, Dougherty, Hessin & Fish

[57] ABSTRACT

A telephone hold circuit for permitting either an incoming or an outgoing call to be held indefinitely, or as long as the party on the other end does not hang up. The circuit employs a silicon controlled switch for latching the circuit in the "hold" condition. The circuit also employs a light emitting diode to provide visual indication when the circuit is in the "hold" condition.

4 Claims, 1 Drawing Figure

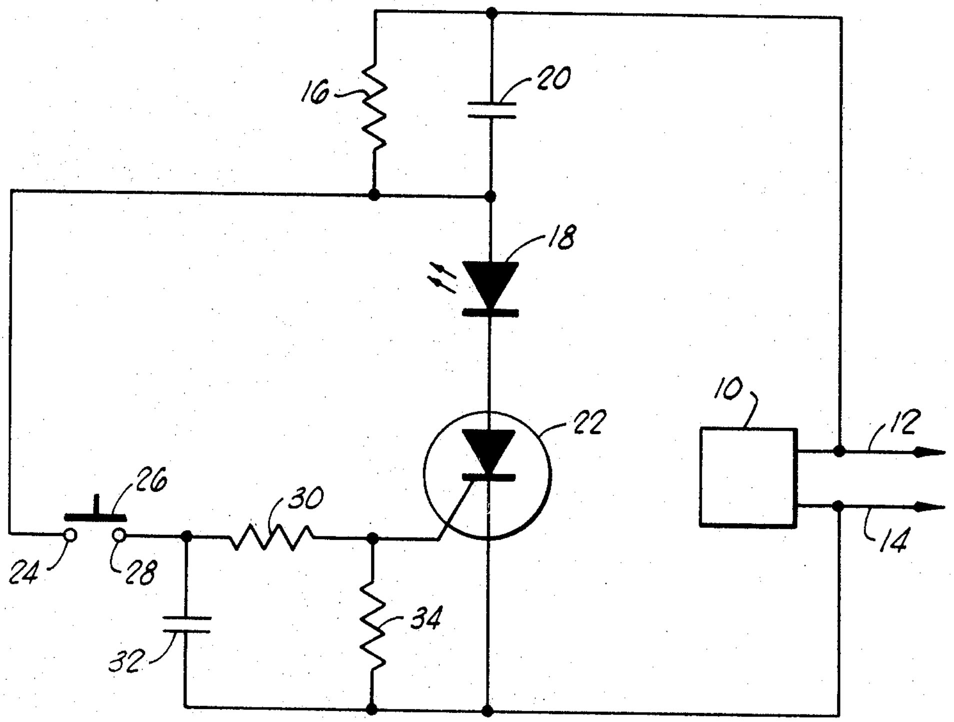
10
12
14
16
18
20
22
24
26
28
30
32
34

TELEPHONE HOLD CIRCUIT

BACKGROUND OF THE INVENTION

1. Field of the Invention

This invention relates generally to improvements in electronic switching, and more particularly, but not by way of limitation, to an improved electronic switch circuit for placing a telephone in a hold condition when the telephone handset is placed back on its hook.

2. Description of the Prior Art

The prior art contains a number of teachings of schemes for maintaining a telephone line in a hold condition which employ relatively complicated electrical circuitry and mechanical apparatus, and are generally restricted to applications in multiline telephone systems. These schemes, however, have not been found to be economically feasible for application to single line residential telephones employing either a single telephone or extension telephones on a single line.

SUMMARY OF THE INVENTION

The present invention contemplates an electronic switching circuit comprising a load; an electronic switch having conductive and non-conductive states and having an input electrode, an output electrode and a control electrode; and indicator means connected in series between said load and the input electrode of said electronic switch for providing indication when current passes therethrough. The circuit further includes means for connecting said load, said indicator means, and said input and output electrodes in series with a direct current source. Also included are a first capacitance connected across said load; a second capacitance; switch means having current passing and current blocking states; and means connecting said switch means and said second capacitance in series across said indicator means and said electronic switch. Also included in the circuit are means coupled to said switch for establishing said switch in the current passing state whereby said second capacitance may be charged; and means coupled to said second capacitance and to the control electrode of said electronic switch which is responsive to the charging of said second capacitance for causing a signal to be applied to the control electrode of said electronic switch whereby said electronic switch is rendered conductive to permit current to pass through the load and indicator means.

An object of the present invention is to provide a highly reliable, solid state, industry acceptable telephone holding and indicating circuit.

Another object of the present invention is to provide a telephone holding and indicating circuit which operates entirely on telephone line current.

Yet another object of the present invention is to provide a telephone holding and indicating circuit whose continuity of operation is not susceptible to interruption due to contact bounce of the telephone hook switch.

A further object of the present invention is to provide a telephone holding and indicating circuit which requires no modification to existing telephone circuits or systems for proper operation and may be connected to the telephone line at any convenient location.

Other objects and advantages of the present invention will be evident from the following detailed description when read in conjunction with the accompanying drawing.

BRIEF DESCRIPTION OF THE DRAWING

The single FIGURE in the drawing is a schematic diagram of the telephone hold circuit constructed in accordance with the present invention.

DESCRIPTION OF THE PREFERRED EMBODIMENT

Referring now to the drawing, a conventional telephone 10 is connected to the positive wire 12 and the negative wire 14 of a conventional subscriber telephone.

One end of a load resistor 16 is connected to the wire 12 while the other end of the resistor 16 is connected to the anode of a light emitting diode 18. A capacitor 20 is also connected between the wire 12 and the anode of the light emitting diode 18.

The cathode of the light emitting diode 18 is connected to the input electrode or anode of a silicon controlled switch or SCS 22. The output electrode or cathode of the SCS 22 is then connected to the wire 14.

One terminal 24 of a momentary, normally-open switch 26 is connected to the anode of the light-emitting diode 18. The other terminal 28 of the switch 26 is connected in series with a resistor 30 to the control electrode or cathode gate of the SCS 22. A capacitor 32 is connected between the terminal 28 and the wire 14 of the telephone line. A resistor 34 is connected between the control electrode or cathode gate of the SCS 22 and the wire 14. The switch 26 is preferably a spring-loaded, momentary, normally-open push-button switch suitable for manual operation.

OPERATION OF THE PREFERRED EMBODIMENT

In operation, approximately 50 volts d.c. appears on a telephone line when the telephone handset is in the "on hook" position. When the handset is in the "off hook" position, as in the case when a call is placed or answered, the telephone line voltage drops to approximately 6 volts d.c. When it is desired to maintain the connection between the two parties on the line, even though the handset at one end may be placed in the on hook position, an equivalent circuit must be substituted for the telephone whose handset is in the on hook position. Such a circuit will maintain 6 volts d.c. on the telephone line and the other party will remain connected. If the voltage is allowed to rise to 50 volts d.c., the telephone company equipment at the central office will disconnect the call.

When the telephone hold circuit of the present invention is to be substituted for the telephone, the user depresses the button on the switch 26 thus permitting current to pass through the resistor 16, the switch 26 and into the capacitor 32. When the capacitor 32 becomes charged to approximately 3 volts d.c., the voltage divider resistors 30 and 34 allow the necessary voltage and current to trigger the SCS 22, thus rendering it conductive. A charge is maintained on the capacitor 32 for a few seconds insuring that the SCS 22 will remain conductive even if the SCS current is interrupted due to contact bounce of the hook switch on the telephone when the handset is placed in the on hook position.

Once the SCS 22 is rendered conductive, current passes through the resistor 16, the light emitting diode 18, and the SCS 22 which is now latched on. The hold button switch 26 may then be released. The light emitting diode 18 is illuminated thereby indicating the hold condition and the resistor 16 provides a voltage drop for the capacitor 20 to charge to.

As noted above, the hold button switch 26 is depressed while the handset is in the off hook position, thus placing both the telephone and the hold circuit on the telephone line momentarily and lowering the telephone line voltage to approximately 4 volts d.c. The handset is then placed in the on hook position leaving the telephone hold circuit on the line in place of the telephone. When the telephone is placed in the on hook position, the telephone line voltage rises from 4 volts to 6 volts by reducing the load current to approximately one half its previous value.

When the telephone handset, or the handset of any extension telephone on the same telephone line, is placed in the off hook position again, the voltage on the telephone line drops to its previous value of 4 volts d.c. In the meantime, the capacitor 20 has been charged to 6 volts when the handset was in the on hook position. When the handset is placed in the off hook position, the capacitor 20 must discharge to the lower telephone line voltage through the telephone.

This discharge of the capacitor 20 causes current to flow in the opposite direction of the holding current through the SCS 22. The net effect is that no current flows and the SCS 22 shuts off or unlatches, releasing the hold on the telephone line so that the parties may then converse.

Since a ringing voltage of approximately 100 volts a.c. will appear on the telephone line wires 12 and 14 when the telephone is ringing, the forward and reverse breakover voltage ratings for the SCS 22 must be sufficient to prevent the SCS 22 from being rendered conductive due to breakover. An SCS having a 200 volt rating provides a satisfactory margin of safety for this application.

Changes may be made in the combination and arrangement of parts or elements as heretofor set forth in the specification and shown in the drawing without departing from the spirit and scope of the invention as defined in the following claims.

What is claimed is:

1. A telephone hold circuit for connection to a telephone line having a positive conductor and a negative conductor:

- a load including a first and second terminal;
- electronic switch means having an input electrode, an output electrode, and a control electrode;
- visual indicator means connected in series between the first terminal of said load and the input electrode of said electronic switch means for providing visual indication when current passes therethrough;
- means connecting the second terminal of said load to the positive conductor of the telephone line;
- means connecting the output electrode of said electronic switch means to the negative conductor of the telephone line;
- first capacitor means connected across said load; second capacitor means including two leads;
- second switch means including two terminals having current passing and current blocking states;
- means connecting said second switch means and said second capacitor means in series across said visual indicator means and said electronic switch means with one terminal of said second switch means being connected to the junction between said load and said visual indicator means, and with a first lead of said second capacitor means being connected to the output electrode of said electronic switch means;
- actuation means coupled to said second switch means for establishing said second switch means in the current passing state whereby said second capacitor means may be charged; and
- resistance means coupling the second lead of said second capacitor means to the control electrode of said electronic switch means to render said electronic switch means conductive when said second capacitor means is charged to permit a current to pass through said load and said visual indicator means.

2. The electronic switching circuit as defined in claim 1 wherein said electronic switch means is characterized further to include:

- a controlled rectifier having an input electrode, an output electrode and a control electrode.

3. The telephone hold circuit as defined in claim 1 wherein said electronic switch means is characterized further to include:

- a silicon controlled switch having the anode thereof connected to the input electrode, having the cathode thereof connected to the output electrode, and having the cathode gate thereof connected to the control electrode.

4. The telephone hold circuit as defined in claim 1 wherein said visual indicator means is characterized further to include:

- a light emitting diode having the anode thereof connected to said load and having the cathode thereof connected to the input electrode of said electronic switch means.

* * * * *